US006833093B2

(12) United States Patent
Lorenz et al.

(10) Patent No.: US 6,833,093 B2
(45) Date of Patent: Dec. 21, 2004

(54) METHOD OF PRODUCING A VEHICLE STEERING WHEEL

(75) Inventors: Christian Lorenz, Leidersbach (DE); Udo Bieber, Niedernberg (DE); Martin Kreuzer, Kleinwallstadt (DE)

(73) Assignee: TRW Automotive Safety Systems GmbH, Achaffenburg (DE)

( * ) Notice: Subject to any disclaimer, the term of this patent is extended or adjusted under 35 U.S.C. 154(b) by 130 days.

(21) Appl. No.: 10/271,116

(22) Filed: Oct. 15, 2002

(65) Prior Publication Data

US 2003/0071385 A1 Apr. 17, 2003

(30) Foreign Application Priority Data

Oct. 15, 2001 (DE) .......................................... 101 50 804

(51) Int. Cl.[7] .............................................. B29C 44/06
(52) U.S. Cl. .................... 264/45.1; 264/45.3; 264/46.4; 264/51; 264/255
(58) Field of Search ................................ 264/45.3, 255, 264/45.1, 46.4, 51

(56) References Cited

U.S. PATENT DOCUMENTS 4,190,697 A * 2/1980 Ahrens .................... 428/309.9
4,804,506 A * 2/1989 Okamoto et al. .......... 264/45.1
5,773,049 A * 6/1998 Kashiwa et al. ............. 425/572
6,383,423 B1 * 5/2002 Kurokawa et al. ......... 264/46.4

FOREIGN PATENT DOCUMENTS

| DE | 29 24 472 C2 | 12/1982 |
| DE | 29 38 231 C2 | 8/1985 |
| DE | 37 40 743 A1 | 6/1988 |
| DE | 299 01 404 U1 | 6/1999 |
| DE | 694 23 864 T2 | 1/2001 |
| EP | 0 251 659 A2 | 1/1988 |

* cited by examiner

Primary Examiner—Allan R. Kuhns
(74) Attorney, Agent, or Firm—Tarolli, Sundheim, Covell & Tummino L.L.P.

(57) ABSTRACT

A method of producing a vehicle steering wheel including a steering wheel rim comprises the following steps: A foaming mold with a top part and a bottom part is used; two different foam components, namely, a central carrier component as well as a soft component surrounding the latter, are injected into the bottom part which is not closed by the top part; the foaming mold is closed by closing the bottom part with the top part, and; the foaming mold is heated.

6 Claims, 2 Drawing Sheets

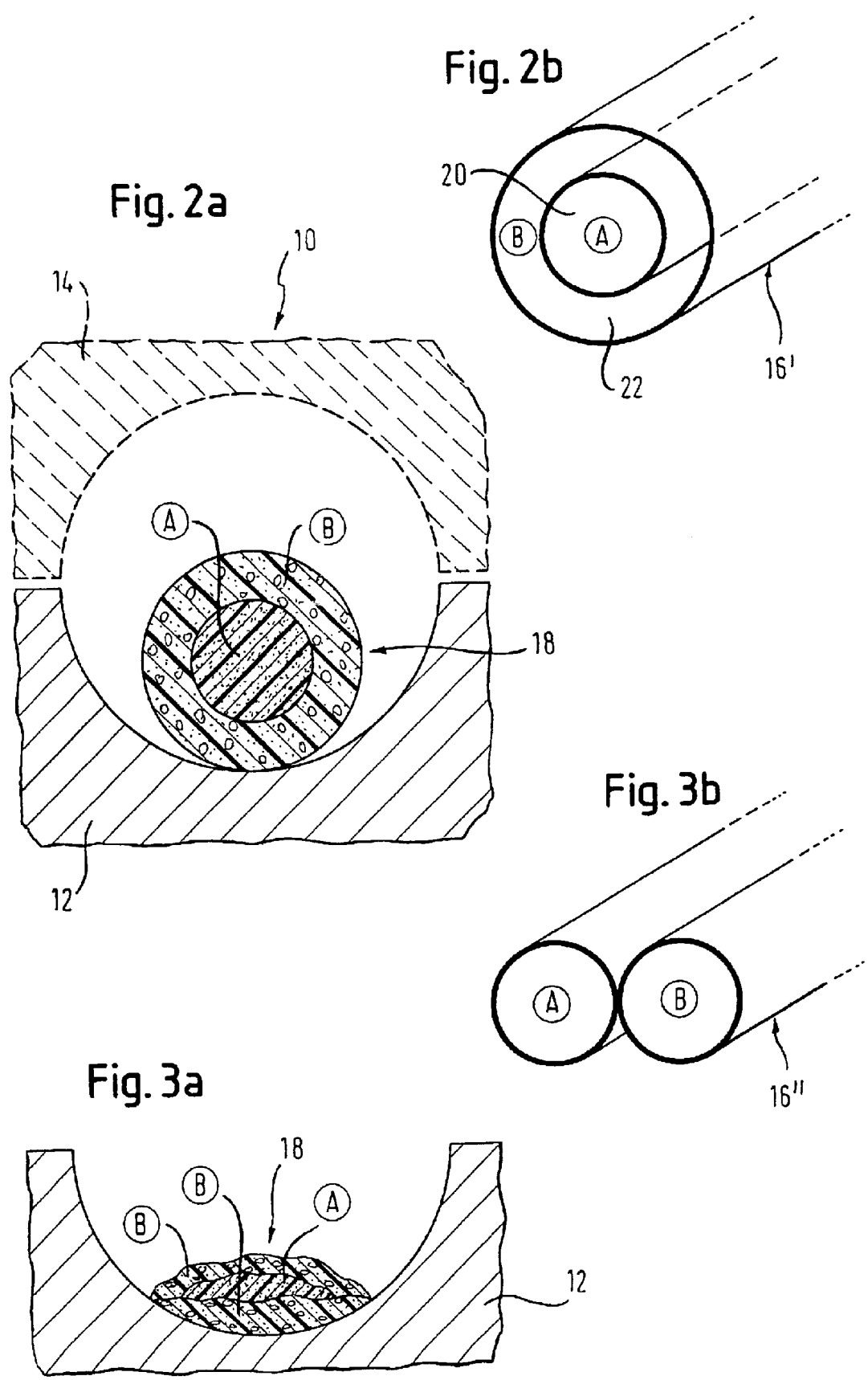

METHOD OF PRODUCING A VEHICLE STEERING WHEEL

TECHNICAL FIELD

The invention relates to a method of producing a vehicle steering wheel.

BACKGROUND OF THE INVENTION

Vehicle steering wheels are often structured in such a way that a metallic skeleton, which forms a base element for the steering wheel rim, spokes and hub, is surrounded by one or more foamed or injection-molded plastic layers. The skeleton provides the necessary stability for the steering wheel, while the plastic layers account for the appearance and feel of the finished steering wheel. In order to reduce the weight as well as to simplify the production method and thus to cut costs, attempts have been made to replace the skeleton with plastic components whenever possible. German utility model DE 299 01 404, for example, describes a steering wheel, the steering wheel rim of which is made completely of a fiber-reinforced plastic. Although this steering wheel achieves a considerable weight reduction while maintaining excellent stability, there is still a problem, namely, the fact that the steering wheel rim has to be reworked in order to ensure that no reinforcement fibers protrude beyond its surface, which would have a negative impact on the tactile comfort.

BRIEF SUMMARY OF THE INVENTION

The present invention proposes a method of producing a vehicle steering wheel which, while maintaining the advantage of using a stable carrier component, can lower the production costs in comparison to the prior-art process.

According to the invention, a method of producing a vehicle steering wheel including a steering wheel rim comprises the following steps: A foaming mold with a top part and a bottom part is used; two different foam components, namely, a central carrier component as well as a soft component surrounding the latter, are injected into the bottom part which is not closed by the top part; the foaming mold is closed by closing the bottom part with the top part, and; the foaming mold is heated. In this manner, one production step suffices to manufacture the load-bearing component of the steering wheel as well as the component that surrounds it and that offers considerable tactile comfort. The introduction of the various components is facilitated by the open foaming mold. Only after the mold has been closed, the foaming procedure takes place in which the plastic layers of the steering wheel acquire their final shape by means of the application of heat. Since the central carrier component is surrounded by the soft component, reworking the surface of the carrier component is not necessary. Moreover, the normally hard carrier component is covered by a soft component with a more pleasant feel.

Preferably, the central carrier component is surrounded by the soft component on all sides in order to ensure a high level of tactile comfort everywhere on the steering wheel.

The central carrier component can be a rigid foam or a fiber-reinforced foam, with the possibility of using familiar materials such as for example, fiberglass or Kevlar-reinforced foams of the type described in German utility model DE 299 01 404.

Advantageously, at least the steering wheel rim can be made up exclusively of the carrier component and the soft component. It is also possible to manufacture the spokes in this manner. Therefore, the steering wheel skeleton can be reduced to a minimum.

In a preferred embodiment of the invention, a nozzle is used to introduce the components into the bottom part, said nozzle having a central outlet for the carrier component and an annular outlet for the soft component surrounding the central outlet. When such a nozzle is used, both components are introduced into the foaming mold in their desired arrangement at the same time so that the production time can be kept to a minimum.

As an alternative, first a bottom layer of soft component material can be introduced into the bottom part, subsequently the carrier component can be applied in a middle section of the bottom layer, and finally, once again, the soft component material can be applied such that the carrier component is surrounded by the soft component. In this case as well, after the completion of the production process, the carrier component is completely surrounded by the soft component. Here, the nozzle for introducing the components does not need to have a complicated configuration.

In this version of the process, the same nozzle can be used for introducing the carrier component and the soft component, or else two different nozzles can be used.

The nozzle is preferably operated by a robot. Among other things, this makes it easier to adapt the method to different steering wheel geometries.

Additional features and advantages of the invention will be apparent from the description below of two embodiments.

BRIEF DESCRIPTION OF THE DRAWINGS

FIG. 2a is a section along the line A—A of FIG. 1 through the foaming mold with a blank according to a first embodiment of the method according to the invention;

FIG. 2b shows a nozzle for carrying out the method illustrated in FIG. 2a;

FIG. 3a is a section along the line A—A of FIG. 1 through the foaming mold with a blank according to a second embodiment of the method according to the invention;

FIG. 3b shows a nozzle for carrying out the method illustrated in FIG. 3a;

DETAILED DESCRIPTION OF THE PREFERRED EMBODIMENTS

Figure 1:
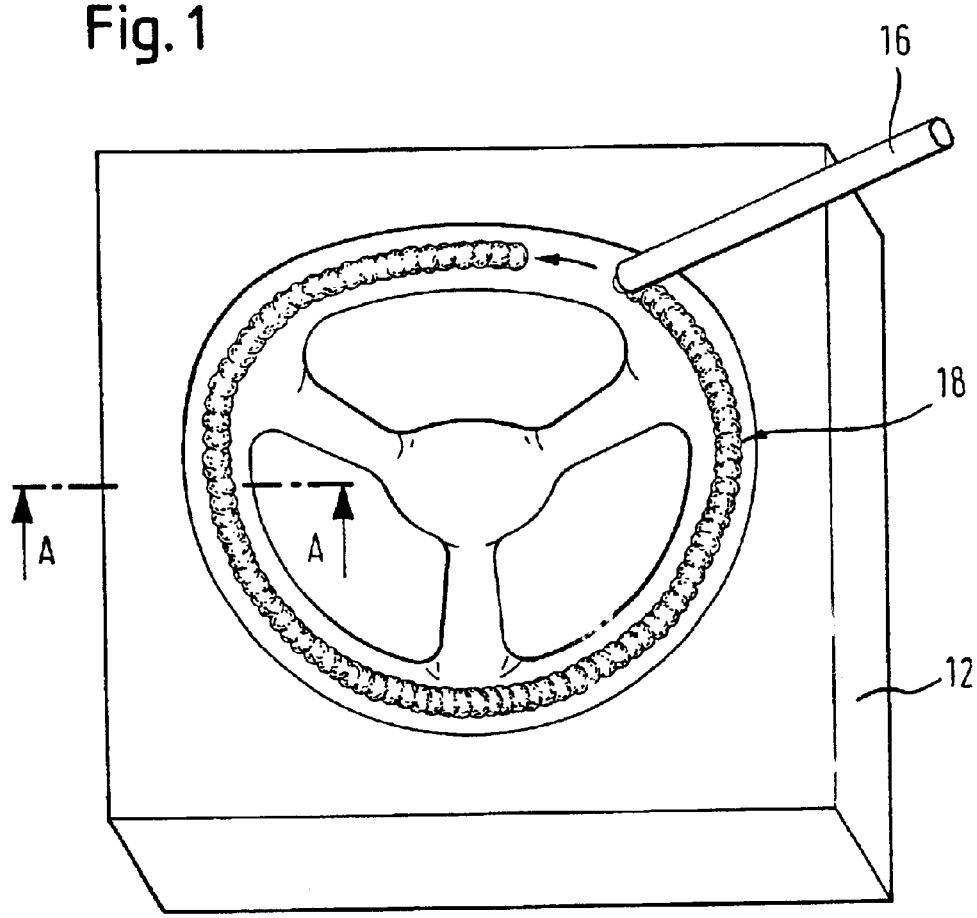
FIG. 1 is a schematic top view of a bottom part of a foaming mold for carrying out the method according to the invention.
Figure 4:
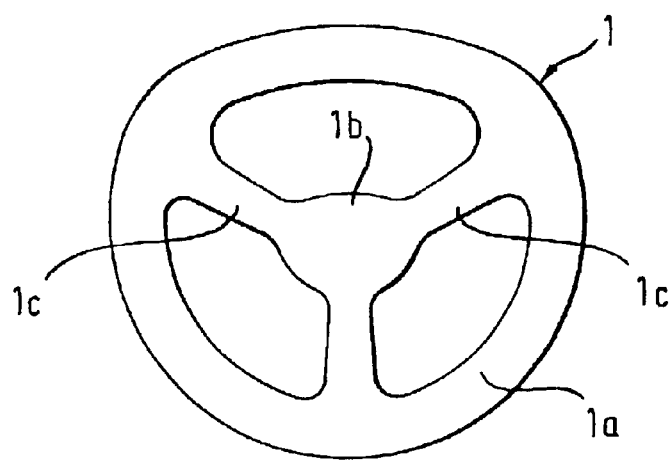
FIG. 4 shows schematically a steering wheel.

The method according to the invention for the production of a vehicle steering wheel 1, including a steering wheel rim 1a, a hub 1b and spokes 1c, uses a two-part foaming mold 10 the bottom part 12 of which is shown in greater detail in FIG. 1. The matching top part 14 is shown schematically in FIG. 2a. The foaming mold 10 forms a negative form of a steering wheel with sections for the steering wheel rim, the hub and the spokes that connect the steering wheel rim with the hub.

A bead 18 consisting of two foam components A, B is introduced into the bottom part 12 by means of a nozzle 16 operated by a robot (not shown here). If only the steering wheel rim is to be made of the foamed material, then the bead 18 is placed as a continuous ring into the steering wheel section of the foaming mold. A metal skeleton would then be placed into the recess for the spokes and the hub and would be foam-covered by a soft foam component B. However, if the spokes and at least part of the hub are to be made of the foamed material, then the bead 18 is also introduced into the recess in the foaming mold 10 that forms the spoke section and, if applicable, also the hub section. The bottom part 12 is not yet closed by the top part 14 when the bead 18 is introduced. After the filling procedure, the bead 18 is encapsulated in the foaming mold 10 in that the foaming mold 10 is closed with the top part 14 (FIG. 2a). Subsequently the bead 18 is heated by heating the foaming mold 10. In this step, components A, B expand and fill the cavity of the foaming mold 10 such that the steering wheel receives its final shape. After the foam components A, B have hardened, the foaming mold 10 is opened and the steering wheel is removed.

Preferably, component A is a rigid foam or a fiber-reinforced foam containing, for example, fiberglass or Kevlar fibers distributed uniformly throughout the foam. After curing, component A, the so-called carrier component, forms the core of the steering wheel and replaces a conventional metal skeleton either partially or completely. In contrast, component B preferably consist of a soft foam. This layer, which will also be referred to below as soft component B, determines the feel of the steering wheel. Here, preferably materials are used that are normally employed for foam-covering steering wheels and that do not require any further reworking. Of course, after the foaming process, the steering wheel can undergo any other conventional finishing of its surface. By the same token, the method is not limited to the use of only two foam components. If a skeleton is used, for example, to shape the hub 1b, it is preferably introduced before or during filling the foam components A, B into the bottom part 12, so that the skeleton is embedded in the resultant foam layers during the foaming procedure.

In a first embodiment of the method according to the invention, both components A, B are introduced into the bottom part 12 at the same time. This is done with a nozzle 16' (FIGS. 2a, 2b) that has a central outlet 20 for component A and an annular outlet 22 for component B, with the annular outlet surrounding the central outlet 20. In the foam blank 18, component A is completely surrounded by component B.

FIGS. 3a and 3b show a second variant of the method according to the invention. In this case, the two components A, B are introduced layer for layer into the bottom part 12 one after the other. For this purpose, as shown in FIG. 3b, a nozzle 16" can be used with which the two components A, B are fed in next to each other, but it is also possible to use a simple nozzle 16 as shown in FIG. 1, with which all of the components flow through the same nozzle.

First of all, a first layer of the soft component B is applied onto the bottom of the bottom part 12. In a next step, a second layer consisting of component A is applied onto the first layer of component B (that is already in the foaming mold) in such a way that this first layer is not completely covered at the edges. Finally, another layer of component B is applied, which is filled into the bottom part 12 in such a way that component A is surrounded on all sides by the soft component B. Subsequently, as described above, a top part 14 is placed onto the bottom part 12 and the foaming mold 10 is heated.

In any case, all of the foam components of the steering wheel are introduced into the foaming mold 10 before it is closed and the actual foaming method begins.

What is claimed is:

1. A method of producing a vehicle steering wheel, said method comprising the following steps:

providing a foaming mold with a top part and a bottom part, said parts defining a ring-shaped cavity in the shape of the vehicle steering wheel when said top part is associated with said bottom part, injecting two different foam components, namely, a central carrier component as well as a soft component surrounding said carrier component into said bottom part, closing said bottom part with said top part to provide said ring-shaped cavity in the shape of the vehicle steering wheel, and heating said foaming mold subsequent to both said foam components being injected into said bottom part to form said steering wheel.

2. A method of producing a vehicle steering wheel, said method comprising the following steps:

a foaming mold with a top part and a bottom part is used, two different foam components, namely, a central carrier component as well as a soft component surrounding said carrier component, are injected into said bottom part which is not closed by said top part, said foaming mold is closed by closing said bottom part with said top part, and said foaming mold is heated, said central carrier component being surrounded on all sides by said soft component.

3. The method according to claim 1, wherein said central carrier component is one of a rigid foam and a fiber-reinforced foam.

4. A method of producing a vehicle steering wheel including a steering wheel rim, said method comprising the following steps:

a foaming mold with a top part and a bottom part is used, two different foam components, namely, a central carrier component as well as a soft component surrounding said carrier component, are injected into said bottom part which is not closed by said top part, said foaming mold is closed by closing said bottom part with said top part, and said foaming mold is heated, at least said steering wheel rim being exclusively made up of said carrier component and said soft component.

5. A method of producing a vehicle steering wheel, said method comprising the following steps:

a foaming mold with a top part and a bottom part is used, two different foam components, namely, a central carrier component as well as a soft component surrounding said carrier component, are injected into said bottom part which is not closed by said top part, said foaming mold is closed by closing said bottom part with said top part, and said foaming mold is heated, a nozzle being used to introduce said components into said bottom part, said nozzle having a central outlet for said carrier component and an annular outlet for said soft component, with said annular outlet surrounding said central outlet.

6. A method of producing a vehicle steering wheel, said method comprising the following steps:

a foaming mold with a top part and a bottom part is used, two different foam components, namely, a central carrier component as well as a soft component surrounding said carrier component, are injected, into said bottom part which is not closed by said top part, said foaming mold is closed by closing said bottom part with said top part, and said foaming mold is heated, wherein firstly, a bottom layer of said soft component is introduced into said bottom part, secondly, said carrier component is applied in a middle section of said bottom layer, and thirdly, said soft component is applied such that said carrier component is surrounded by said soft component.

* * * * *